United States Patent
Vasquez et al.

(10) Patent No.: US 10,578,186 B2
(45) Date of Patent: Mar. 3, 2020

(54) SPRING SEAT VIBRATION DAMPER APPARATUS FOR USE WITH PRESSURE REGULATORS

(71) Applicant: Emerson Process Management Regulator Technologies, Inc., McKinney, TX (US)

(72) Inventors: Ernesto Vasquez, Dallas, TX (US); Justin Wade Hart, Melissa, TX (US); Tony Alan Durant, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/339,444

(22) Filed: Oct. 31, 2016

(65) Prior Publication Data
US 2018/0119771 A1    May 3, 2018

(51) Int. Cl.
*G05D 16/02*     (2006.01)
*G05D 16/04*     (2006.01)
(Continued)

(52) U.S. Cl.
CPC ............ *F16F 13/007* (2013.01); *F16F 1/128* (2013.01); *F16F 15/022* (2013.01); *G05D 16/04* (2013.01);
(Continued)

(58) Field of Classification Search
CPC .... F16F 2232/08; F16F 13/007; F16F 15/022; G05D 16/02; G05D 16/04
(Continued)

(56) References Cited

U.S. PATENT DOCUMENTS 2,103,576 A  *  12/1937   Dockson ............ G05D 16/0663
                                                    137/505.18
3,583,772 A  *   6/1971   Reno .................... B60T 8/1843
                                                    137/495
(Continued)

FOREIGN PATENT DOCUMENTS

GB      1084960      9/1967
JP      2012087906   5/2012
WO      2004070245   8/2004

OTHER PUBLICATIONS

International Searching Authority, "International Search Report," issued in connection with International Application No. PCT/US2017/058074, dated Feb. 1, 2018, 5 pages.
(Continued)

*Primary Examiner* — Marina A Tietjen
*Assistant Examiner* — Paul J Gray
(74) *Attorney, Agent, or Firm* — Hanley, Flight & Zimmerman, LLC (57) ABSTRACT

Spring seat vibration damper apparatus for use with fluid pressure regulators are disclosed. A disclosed apparatus includes a first spring seat of a fluid pressure regulator defining a first protrusion and a second spring seat of the fluid pressure regulator defining a second protrusion. The second protrusion is configured to receive at least a portion of the first protrusion. The first spring seat moves relative to the second spring seat to provide a damping effect between the protrusions.

25 Claims, 5 Drawing Sheets

(51) Int. Cl.
*F16F 13/00* (2006.01)
*F16F 15/02* (2006.01)
*F16F 1/12* (2006.01)

(52) U.S. Cl.
CPC ..... *F16F 2228/066* (2013.01); *F16F 2232/08* (2013.01)

(58) Field of Classification Search
USPC .............................................. 137/505, 505.32
See application file for complete search history.

(56) References Cited

U.S. PATENT DOCUMENTS

| | | | |
|---|---|---|---|
| 4,817,821 A | 4/1989 | Simoens | |
| 4,966,183 A * | 10/1990 | Williamson, Jr. | ............................ G05D 16/0663 137/116.5 |
| 5,443,083 A * | 8/1995 | Gotthelf | ........... B60K 15/03006 137/340 |
| 6,289,925 B1 * | 9/2001 | Miyazoe | ............ G05D 16/0661 137/505.41 |
| 6,675,831 B2 * | 1/2004 | Sakaguchi | ................ F17C 1/06 137/505.25 |
| 7,520,297 B2 * | 4/2009 | Bell | ........................ G05D 16/10 137/505 |
| 8,485,213 B2 * | 7/2013 | Hawkins | ............... F16K 17/105 137/116.5 |
| 2011/0240030 A1 * | 10/2011 | Ho | ........................ A61M 16/06 128/206.21 |
| 2014/0150903 A1 * | 6/2014 | Yamauchi | ............ G05D 16/163 137/489.5 |

OTHER PUBLICATIONS

International Searching Authority, "Written Opinion," issued in connection with International Application No. PCT/US2017/058074, dated Feb. 1, 2018, 6 pages.

* cited by examiner

SPRING SEAT VIBRATION DAMPER APPARATUS FOR USE WITH PRESSURE REGULATORS

FIELD OF THE DISCLOSURE

This disclosure relates generally to fluid control devices and, more particularly, spring seat vibration damper apparatus for use with pressure regulators.

BACKGROUND

Process control systems employ pressure regulators (e.g. reducing regulators, backpressure regulators, etc.) to control a pressure and/or flow of a fluid (e.g., liquid, gas, steam, etc.). Actuating components (e.g., a diaphragm, a piston etc.) within a pressure regulator are typically coupled to a fluid control member (e.g., a plug) and are responsive to a pressure of the fluid within a housing of the regulator to control a position of the fluid control member that controls an output pressure and flow rate of a fluid at the outlet of the pressure regulator. The actuating components are typically coupled to a pair of spring seats having a coil spring between the spring seats to provide a biasing force to the actuating components and, thus, a biasing force to the fluid control member. The spring-biased actuating components or fluid control member provide a control point or a desired outlet pressure that remains substantially constant despite variations in pressure at the inlet of the pressure regulator.

SUMMARY

An example apparatus includes a first spring seat of a fluid pressure regulator defining a first protrusion and a second spring seat of the fluid pressure regulator defining a second protrusion. The second protrusion is configured to receive at least a portion of the first protrusion. The first spring seat moves relative to the second spring seat to provide a damping effect between the protrusions.

Another example apparatus includes a first spring seat of a fluid pressure regulator and a second spring seat of the fluid pressure regulator opposite the first spring seat. At least a portion of the first spring seat is slidably disposed in the second spring seat to form a damping chamber between the spring seats.

Another example apparatus includes a first spring seat of a fluid pressure regulator operatively coupled to a damping chamber and a second spring seat of the fluid pressure regulator operatively coupled to the damping chamber, wherein the damping chamber is to dampen relative movement between the first and second spring seats. The example apparatus also includes a spring positioned between the spring seats.

The figures disclosed herein are not to scale. Wherever possible, the same reference numbers will be used throughout the drawings and accompanying written descriptions to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Pressure regulators are utilized to regulate a pressure of a fluid (e.g., natural gas, liquid petroleum, etc.) at the regulator inlet to a substantially constant output pressure at the regulator output. Actuating components (e.g., diaphragms, pistons, etc.) within a housing of a pressure regulator are responsive to a pressure of a fluid within the housing to stroke or move between control positions. A pair of spring seats having a coil spring between them are typically positioned between the actuating components and the housing to provide a biasing force to the actuating components and/or a fluid control member (e.g. a plug). One spring seat may be coupled to the actuating components and the other spring seat may be coupled to an adjusting device coupled to the housing to provide a biasing force that defines a desired output pressure that remains substantially constant despite turbulence and variations in pressure at the inlet and/or within the housing.

In certain fluid control applications (e.g., operations involving high pressures and/or high flow rates of a fluid), movements of the actuating components during operation may become violent and/or substantially undamped. This type of movement can produce high amplitude oscillations or vibrations that may negatively affect the fluid control member and, more generally, the performance and stability of the regulator. In such applications, the outlet pressure of some regulators may vary (e.g., drift or shift) or become unstable (e.g., vary, oscillate, etc.). Components within the regulator may wear, loosen or become damaged from high amplitude oscillations. Further, forces applied to the spring seats by the compressed coil spring may cause the seats to tilt or become otherwise misaligned relative to each other and allow the coil spring to buckle (i.e. allow the central axis of the spring to curve). Buckling of the coil spring during operation may further damage or excessively wear components within the regulator and affect the performance of the regulator. For example, a coil spring may be surrounded by a spring casing and buckling may cause the spring to contact the inner wall of the casing and wear the casing wall. Additionally, buckling of the coil spring may cause misalignment of the actuating components and/or fluid control member, a shift in the control point, and/or, more generally, degraded control performance of the pressure regulator.

The example spring seat vibration damper apparatus described herein may be advantageously used within fluid pressure regulators (e.g. reducing regulators, backpressure regulators, etc.) to reduce and/or eliminate vibration or turbulence induced output pressure fluctuations, oscillations or, more generally, instabilities that may be caused by rapid and/or undamped movement of actuating components and/or fluid control members within the regulators. Further, the example spring seat vibration damper apparatus may be used to prevent or resist buckling of a coil spring between a pair of spring seats within the regulator. Generally, the example spring seat vibration damper apparatus disclosed herein may be integrated within pressure regulators to provide stability and/or improved performance during the above-described applications.

More specifically, the example spring seat vibration damper apparatus described herein provides a damping chamber operationally interposed between a pair of spring seats within a fluid pressure regulator. The damping chamber may be operationally coupled to each of the spring seats to provide a damping effect as the spring seats move relative to each other. Further, the example spring seat vibration damper apparatus may be adjustable to adjust a magnitude of the damping effect.

In some examples, the damping chamber is formed by two cylindrically-shaped bodies or protrusions sized to fit within a coil spring between the spring seats. The first cylindrically-shaped protrusion may be coupled to a first spring seat and the second cylindrically-shaped protrusion may be coupled to a second spring seat. The second protrusion includes a bore or cavity configured to slidably receive at least a portion of the first protrusion such that a damping chamber is formed between the protrusions.

In some examples, the damping chamber contains a compressible fluid (e.g., air) and includes a bleed port or orifice extending through a wall of the cavity. The fluid may flow through the orifice from an interior of the chamber to an exterior of the chamber and/or from an exterior of the chamber to an interior of the chamber as the spring seats move relative to each other.

In some examples, characteristics (e.g., size, shape, location, etc.) of the bleed orifice and/or flow parameters of the fluid may vary to provide a desired damping effect of the example spring seat vibration damper apparatus. In such examples, an adjuster (e.g., an adjusting screw, a needle valve, etc.) may be operable to adjust the characteristic of the bleed orifice and/or adjust flow parameters of the fluid to enable variable control of the damping effect.

In some examples, a portion of the first protrusion may engage the wall of the cavity to provide a seal to ensure the fluid within the damping chamber only flows through the orifice. The seal may be an O-ring disposed within a gland of either the protrusion or the cavity. Additionally or alternatively, the portion of the first protrusion may engage the wall of the cavity to substantially guide, support and/or align the axes of the spring seats and/or the coil spring.

Figure 1:
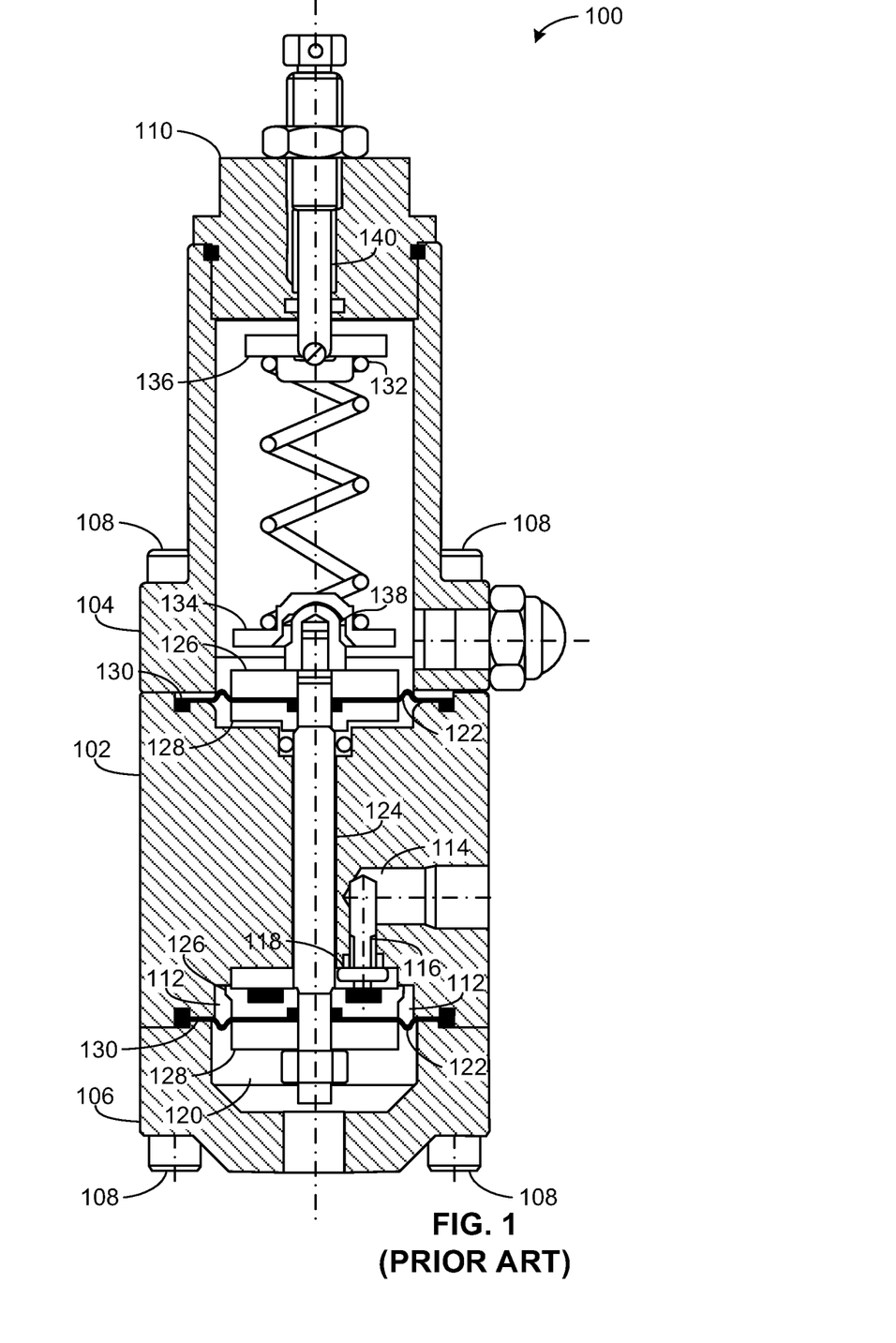
FIG. 1 illustrates a cross-sectional view of a known fluid pressure regulator.

FIG. 1 is a cross-sectional view of a known pressure regulator 100. The pressure regulator 100 includes a body 102 having an upper portion or bonnet 104 and a lower cover 106 fastened to the body 102 via fasteners 108 (e.g., screws). The pressure regulator 100 also includes a cap 110 threadably fastened to the bonnet 104. In this example, the body 102, the lower cover 106, the bonnet 104 and the cap 110 define a housing of the pressure regulator 100 to provide a control chamber 112 having an inlet (not shown) and an outlet 114, such that a fluid can flow from an exterior of the pressure regulator 100 to the control chamber 112 through the inlet and/or from the control chamber 112 to an exterior of the pressure regulator 100 through the outlet 114. A flow control member 116 within the body 102 is movable relative to a seat or opening 118 at the interface between the inlet and/or outlet 114 and the control chamber 112 to control the flow of the fluid through the inlet and/or outlet 114. In this example, the body 102 and the lower cover 106 define a sensing chamber 120 that is sensitive to pressure changes to monitor an output and/or downstream pressure of the fluid.

The pressure regulator 100 may further include a diaphragm 122 or other actuating components (e.g., a piston) within the control chamber 112 to enable movement of the flow control member 116. In this example, the pressure regulator 100 includes two opposing diaphragms 122 coupled together via a stem 124, such that the diaphragms 122 move in tandem. Each diaphragm 122 is typically coupled between a respective upper diaphragm plate 126 and lower diaphragm plate 128 to provide a rigid backing to the diaphragms 122. The rigid backing enables sensing surfaces of the diaphragms 122 to remain substantially flat during operation of the regulator 100 and provides structural support to the diaphragms 122 and/or other components (e.g. the stem 124, the flow control member 116, etc.) fastened to the diaphragms 122. An outer edge or lip 130 of each diaphragm 122 may be clamped or captured between portions of the bonnet 104 and the body 102 and/or the lower cover 106 and the body 102 to provide a fluid seal for the control chamber 112 and/or sensing chamber 120, such that the fluid within the control chamber 112 and/or the sensing chamber 120 cannot flow past the diaphragms 122. As will be described in greater detail below, the sensing surfaces of the diaphragms 122 may be exposed to a pressure of the fluid within either the control chamber 112 and/or the sensing chamber 120 to actuate, stroke and/or move between control positions and, thus, move the flow control member 116. The position of the flow control member 116 affects the size or area of the opening 118 to change flow parameters of the fluid through the inlet and/or outlet 114. In this example, the flow control member 116 is coupled to the upper diaphragm plate 126 associated with the lowermost (in the orientation of FIG. 1) diaphragm 122.

The pressure regulator 100 further includes a spring 132 (e.g. a coil spring) or biasing element disposed between a pair of spring seats 134, 136 within the bonnet 104. The spring seats 134, 136 may be operatively coupled to the diaphragms 122 and the bonnet 104 of the pressure regulator 100 to provide a biasing force to the diaphragms 122. In this example, the lower spring seat 134 is coupled to the upper diaphragm plate 126 via an upper diaphragm plate nut 138 associated with the uppermost diaphragm 122 and the upper spring seat 136 is coupled to an adjusting screw 140, such that movement of the diaphragms 122 enables the spring 132 to compress and/or expand and, thus, provide the biasing force. The adjusting screw 140 is operatively coupled to the cap 110 and extends through the cap 110 to enable fine adjustments or movements of the upper spring seat 136 relative to the lower spring seat 134 and, thus, enable fine adjustments of the biasing force provided by the spring 132.

Prior to and/or during operations of the pressure regulator 100, biasing forces provided by the spring 132 and pressure forces exerted by the fluid on sensing surfaces of the diaphragms 122 define an equilibrium or a control point of the pressure regulator 100. The adjusting screw 140 may be used to finely adjust the biasing force provided by the spring 132 and, thus, the control point (e.g., the output pressure).

During operation, movement of the diaphragms 122 and/or the flow control member 116 may be rapid and/or substantially undamped. This type of movement can produce high amplitude oscillations and/or vibrations within the pressure regulator 100. High amplitude oscillations may loosen and/or excessively wear components within the pressure regulator 100 (e.g., fastening components, actuating components, springs, casings, O-rings, etc.). Vibrations transmitted to the flow control member 116 may disturb the behavior or relationship between the flow control member 116 and the opening 118 to cause an unstable fluid flow (e.g., turbulence, a fluctuating pressure, etc.) through the pressure regulator 100.

Additionally or alternatively, during compression of the spring 132, the biasing force exerted on the spring seats 134, 136 may cause the spring seats 134, 136 to tilt relative to each other and allow the spring to 132 to buckle (i.e. allow the central axis of the spring 132 to curve). Buckling of the spring 132 during operations of the pressure regulator 100 may cause excessive wear and damage to components within the pressure regulator 100 and may negatively affect the output pressure. For example, the spring 132 may contact an inner wall of the housing or a spring case within the pressure regulator 100 to deteriorate and/or thin the wall. Further, buckling of the spring 132 may alter the biasing force provided to the diaphragms 122 and flow control member 116 and, thus, alter the equilibrium and/or control point of the pressure regulator 100.

Figures 2A, 2B:
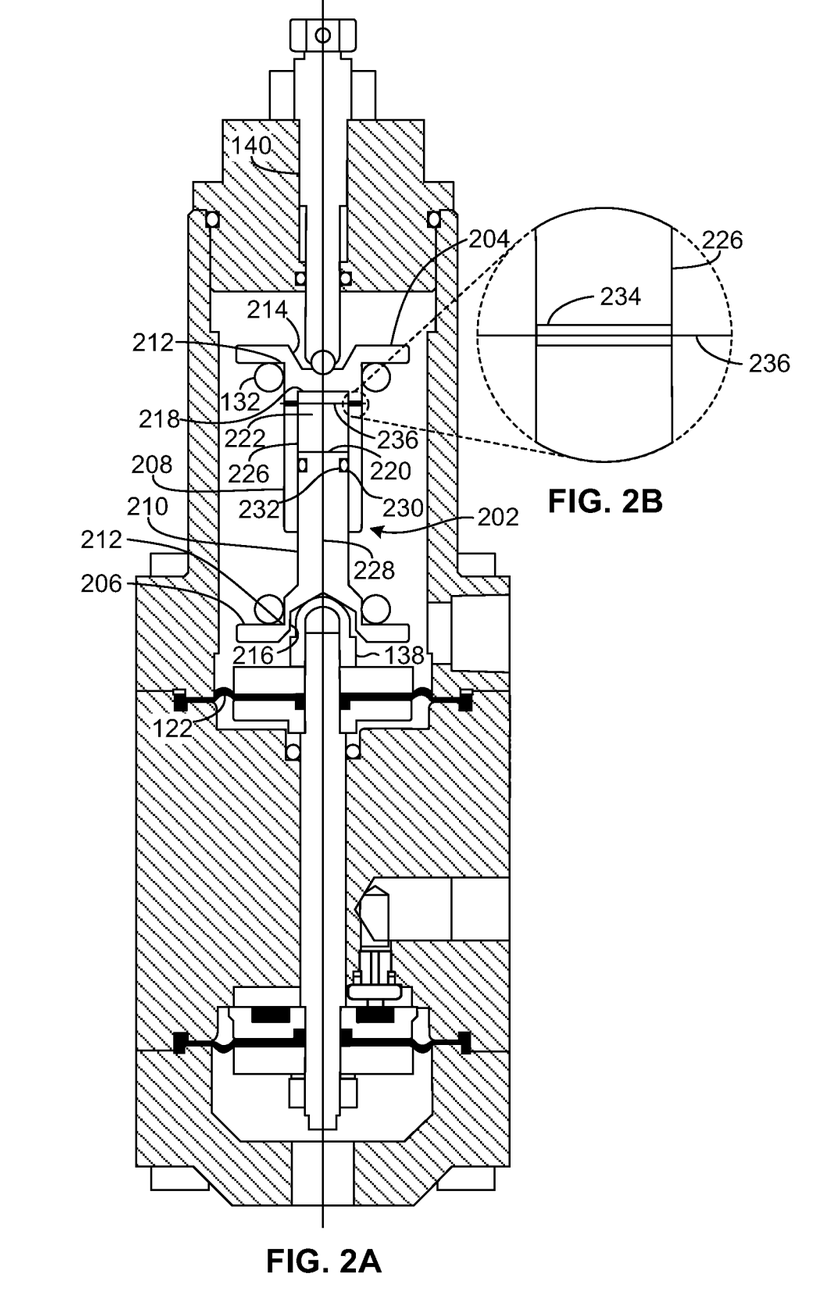
FIG. 2A illustrates cross-sectional view of a fluid pressure regulator implemented with an example spring seat vibration damper apparatus in accordance with the teachings of this disclosure.
FIGS. 2B and 2C are enlarged cross-sectional views of the example spring seat vibration damper apparatus shown in FIG. 2A.
Figure 2C:
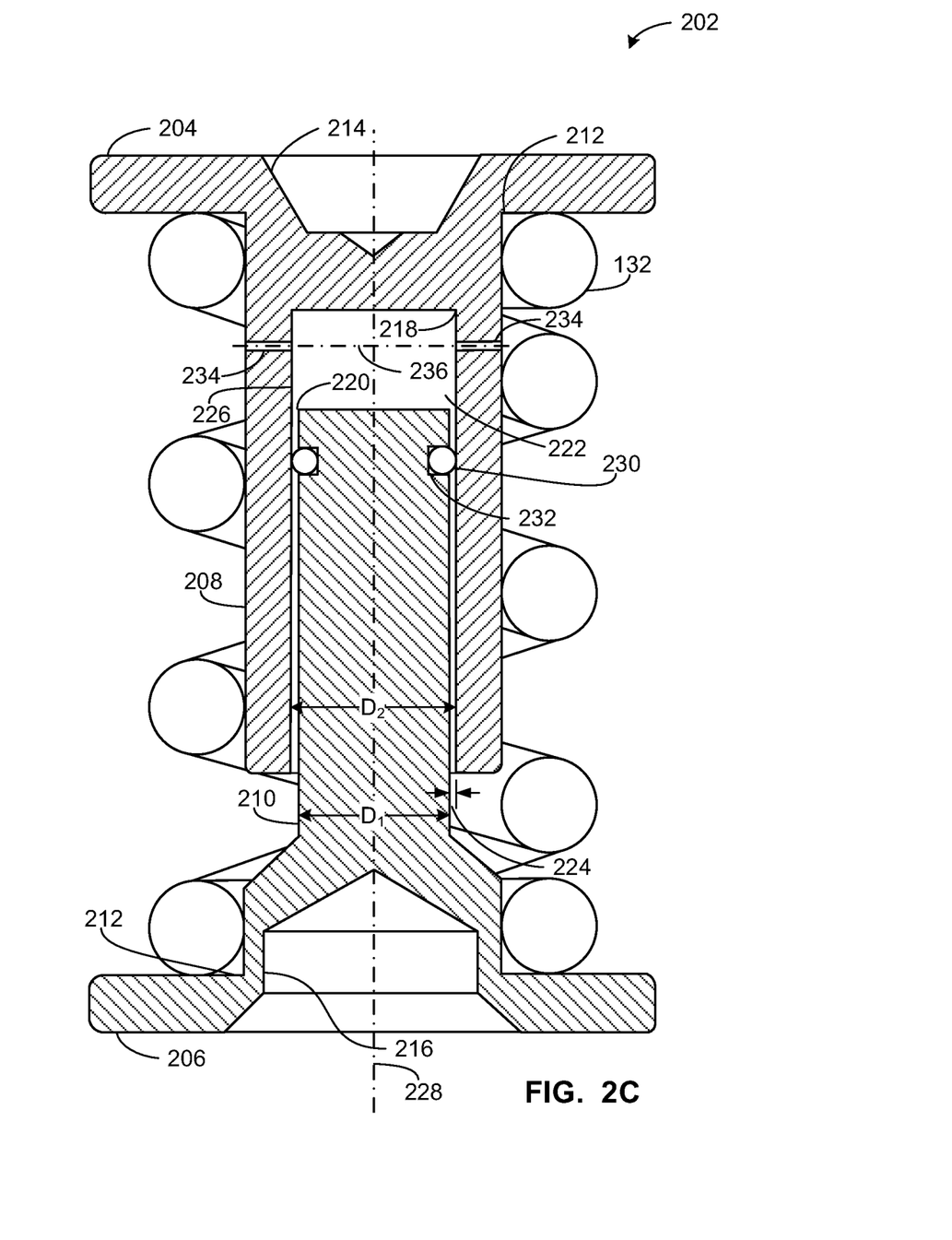

FIG. 2A illustrates an example pressure regulator 200 implemented with an example spring seat vibration damper apparatus 202 in accordance with the teachings herein. FIGS. 2B and 2C illustrate enlarged cross-sectional views of the example spring seat vibration damper apparatus 202 shown in FIG. 2A. Turning in detail to FIGS. 2A, 2B and 2C, the example spring seat vibration damper apparatus 202 is operationally interposed between a pair of spring seats 204, 206.

The example spring seat vibration damper apparatus 202 includes an upper protrusion or portion 208 and a lower protrusion or portion 210 configured to, at least partially, slidably receive and/or engage each other. The upper and lower portions 208, 210 may be composed of any suitable material such as stainless steel, powdered metal, plastic, etc. and may be manufactured using any suitable manufacturing process such as casting, molding, machining, etc. In this example, the upper portion 208 includes the first spring seat 204 and the lower portion 210 includes the second spring seat 206. In some examples, the spring seats 204, 206 are not integral with the upper and lower portions 208, 210 and, instead, are separate components. In such examples, the spring seats 204, 206 may be coupled to the upper and lower portions 208, 210 via any appropriate fastening device, technique and/or substance (e.g., screws, adhesives, welds, etc.). In any case, the spring seats 204, 206 are configured to capture the spring 132 such that opposing shoulders 212 of the spring seats 204, 206 receive and engage respective ends of the spring 132. The spring seats 204, 206 may include centrally disposed recesses, apertures, male/female connectors, etc. to receive supporting or structural components (e.g., the adjusting screw 140, the upper diaphragm plate nut 138, etc.) within the pressure regulator 200 and, more generally, to couple the spring seats 204, 206 to the pressure regulator 200 and/or the diaphragms 122. In this example, the first spring seat 204 includes a first annular recess 214 to couple the first spring seat 204 and the upper portion 208 to the adjusting screw 140 and the second spring seat 206 includes a second annular recess 216 to couple the second spring seat 206 and the lower portion 210 to the diaphragms 122 via the upper diaphragm plate nut 138.

In this example, the upper portion 208 includes a bore or cavity 218 configured to slidably receive a stem or protrusion 220 of the lower portion 210 to form a damping chamber 222 between the spring seats 204, 206. A shape of the protrusion 220 may be complimentary to a shape of the cavity 218. In this example, the cavity 218 and the protrusion 220 are cylindrically-shaped and have respective diameters (FIG. 2C) $D_1$ and $D_2$. The diameter $D_1$ of the protrusion 220 may be slightly smaller than a diameter $D_2$ of the cavity 218 to provide a clearance or gap 224 between a wall 226 of the cavity 218 and the protrusion 220. The gap 224 allows guided relative movement between the cavity 218 and the protrusion 220. In some examples, the gap 224 is relatively small to restrict movement between the protrusion 220 and the cavity 218 to a substantially single common axis (i.e., reduce degrees of freedom for the protrusion 220 and the cavity 218) 228 relative to a longitudinal axis of the protrusion 220 and the cavity 218, such that the movement of the protrusion 220 and the cavity 218 and, thus, movement of the upper portion 208 and the lower portion 210 is substantially along the axis 228.

In this example, the cavity 218, the protrusion 220 and/or, more generally, the damping chamber 222 are sized to fit within an inner diameter of the spring 132, such that the wall 226 of the cavity 218, the protrusion 220 and/or, more generally, the damping chamber 222 do not contact a surface of the spring 132 when the spring is expanded. In other examples, the damping chamber 222 is sized and/or configured to be exterior to the spring 132. In such examples, the spring 132 is disposed within the damping chamber 222 and configured to not contact the wall 226 such that an outer surface of the spring 132 does not contact the wall 226 when the spring 132 is fully compressed.

The example spring seat damper apparatus may further include a fluid (e.g., air, oil, etc.) contained within the damping chamber 222. A fluid seal (e.g. an O-ring) 230 may be disposed between the wall 226 and the protrusion 220 to prevent the fluid from flowing past the seal 230. In this example, the seal 230 is depicted as an O-ring disposed within a seal gland 232 of the protrusion 220. In other examples, one or more seals 230 are disposed within multiple seal glands 232 of the cavity 218 and/or the protrusion 220. The use of multiple seals 230 disposed within multiple seal glands 232 may provide improved alignment and/or orientation of the upper portion 208 relative to the lower portion 210 to guide relative movements between the protrusion 220 and the cavity 218 and/or reduce wear to the seals 230. Additionally or alternatively, in some examples, the protrusion 220, at least partially, frictionally engages the wall 226 to provide the fluid seal.

The example spring seat vibration damper apparatus 202 may further include a bleed port or orifice 234 (FIGS. 2B and 2C) disposed on the upper portion 208 and adjacent to the damping chamber 222 to provide a flow path or channel for the fluid to flow, such that the fluid can fluidly flow from an interior of the damping chamber 222 to an exterior of the damping chamber 222 through the bleed orifice 234 and/or from an exterior of the damping chamber 222 to an interior of the damping chamber 222. In this example, two opposing bleed orifices 234 are located on the wall 226 of the cavity 218 and extend through the wall 226. Multiple bleed orifices 234 may be configured to balance or compensate for forces produced by the fluid accelerating through the bleed orifices 234. Unbalanced or uncompensated forces produced by the accelerating fluid may cause the damping chamber 222 and/or the example spring seat vibration damper apparatus 202 to move, oscillate etc. during operation. Additionally or alternatively, one or more bleed orifice 234 may be blocked due to build up (e.g., dirt, grime, dust, etc.) within the orifice(s) 234 to disturb or restrict the flow of the fluid through the orifice(s) 234. Multiple bleed orifices 234 may provide alternate paths for the fluid to flow and allow continued fluid flow and/or function despite the presence of one or more blocked or non-functional bleed orifice 234.

The bleed orifice(s) 234 may be configured to have a particular orientation, shape and/or cross-section to achieve a desired bleed characteristic. In this example, the bleed orifices 234 are located on an axis 236 perpendicular to the longitudinal axis 228 and are substantially cylindrical and/or have substantially circular cross-sections. Alternate orientations of the bleed orifice(s) 234 may be used to change a flow direction of the fluid through the bleed orifice(s) 234. For example, the damping chamber 222 and/or, more generally, the pressure regulator 200 may contain a foreign substance or fluid (e.g., water) that may interfere with the operation of the damping chamber 222 and/or the example apparatus 202. The bleed orifice(s) 234 may be located on another axis having a significant angle of elevation and/or depression relative to the axis 236 to effectively direct or guide a flow of the foreign fluid out of and/or away from the damping chamber 222 and/or prevent foreign fluid from entering the damping chamber 222. Alternate shapes and/or cross-sections may be used to define the bleed orifice(s) 234 to further affect the flow of the fluid through the bleed orifice(s) 234 and/or the bleed characteristic. In some examples, the shape varies through the cross-section of the wall of the cavity 218 and may be tapered or conical. Varying cross-sectional shapes of the bleed orifice(s) 234 may reduce forces produced by the fluid and/or reduce turbulence of the fluid.

During operation of the pressure regulator 200, the example apparatus 202 provides a damping effect (i.e. dissipates energy) as the lower spring seat 206 and the diaphragms 122 move relative to the first spring seat 204 or, more generally, as the spring seats 204, 206 move relative to each other. Additionally or alternatively, the protrusion 220 may engage the wall 226 of the cavity 218 to reduce degrees of freedom of the upper and lower portions 208, 210 and, thus, reduce degrees of freedom of the spring seats 204, 206, such that movement of the spring seats 204, 206 is substantially along the axis 228. As a result, forces provided to the spring seats 204, 206 during compression of the spring 132 may be supported by the engagement of the protrusion 220 and the wall 226 to substantially resist relative tilting between the spring seats 204, 206 and, thus, substantially resist and/or prevent buckling of the spring 132.

More specifically, in this example, the fluid within the damping chamber 222 flows through the bleed orifices 234 to provide the damping effect. A magnitude of the damping effect may be dependent on, at least partially, a volume of the damping chamber 222, a characteristic of the bleed orifice(s) 234, a property (e.g., density, viscosity, compressibility, etc.) of the fluid, a flow parameter (mass flow rate, flow velocity, etc.) of the fluid and/or frictional engagement between the upper and lower portions 208, 210.

In some examples, the example spring seat vibration damper apparatus 202 may include an adjusting device (e.g., an adjusting screw, a needle valve, a poppet valve etc.) operatively coupled to the bleed orifice(s) 234 to adjust the characteristic of the bleed orifice(s) 234, the flow parameter of the fluid through the bleed orifice(s) 234 and/or, more generally, to adjust the magnitude of the damping effect.

Figures 3A, 3B, 3C:
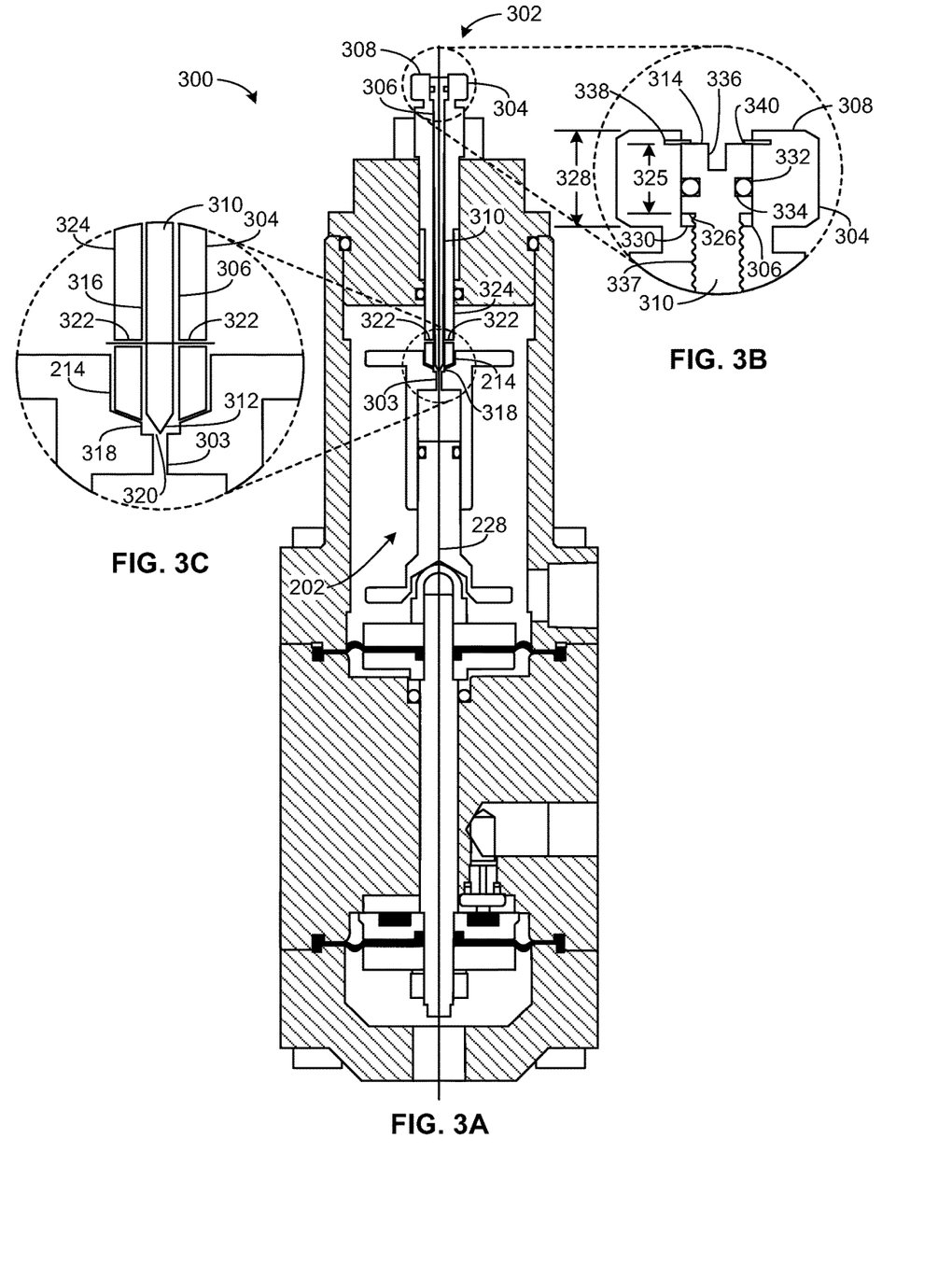
FIG. 3A illustrates an alternative example spring seat vibration damper apparatus in accordance with the teachings of this disclosure.
FIGS. 3B and 3C are enlarged cross-sectional views of the example spring seat vibration damper apparatus shown in FIG. 3A.

FIG. 3A illustrates an example pressure regulator 300 implemented with the example spring seat vibration damper apparatus 202 including an adjuster 302. FIGS. 3B and 3C illustrate enlarged cross-sectional views of the adjuster 302 shown in FIG. 3A. Turning in detail to FIGS. 3A, 3B and 3C, the adjuster 302 is operatively coupled to a bleed port or orifice 303 and/or, more generally, operatively coupled to the example spring seat vibration damper apparatus 202. The adjuster 302 may be integral with an adjusting screw 304 to provide accessibility to the adjuster 302. In such examples, the adjusting screw 304 includes a bore 306 centrally disposed on an upper surface 308 of the adjusting screw 304 and extending through a longitudinal length of the adjusting screw 304 along the axis 228. A stem portion 310 of the adjuster 302 is centrally disposed within the bore 306 and extends from a first end (FIG. 3C) 312 of the adjuster 302 along the axis 228 and through the bore 306 to expose a second end (FIG. 3B) 314 of the adjuster 302. The stem portion 310 may be slightly smaller than the bore 306 to provide a channel 316 between the stem portion 310 and the bore 306. In this example, the bleed orifice 303 is centrally disposed on a surface 318 of the first annular recess 214 and adjacent to the channel 316.

The bleed orifice 303 may be adjacent to the first end 312 of the adjuster 302 to provide a gap or opening 320 between the bleed orifice 303 and the first end 312 configured to enable the fluid to flow from the bleed orifice 303 to the channel 316 and/or flow from the channel 316 to the bleed orifice 303.

The adjusting screw 304 may further include a secondary orifice 322 disposed on an outer radial surface 324 of the adjusting screw 304 and extending radially inward through the adjusting screw 304 to the bore 306 and/or channel 316 to enable the fluid to flow from an exterior of the channel 316 to an interior of the channel 316 through the secondary orifice 322 and/or from an interior of the channel 316 to an exterior of the channel 316. In this example, the adjusting screw 304 includes two opposing secondary bleed orifices 322. The channel 316 and/or the secondary orifice(s) 322 may be sized and/or configured to not disturb or restrict the flow of the fluid through the bleed orifice(s) 303 such that the damping effect, the flow of the fluid and/or, more generally, performance of the example spring seat vibration damper apparatus 202 is not compromised, altered and/or affected by the secondary orifices 322 and/or the channel 316.

A first section 325 of the second end 314 may be slightly larger than the stem portion 310 to provide a lip 326 and may be configured to fit within a second section 328 of the bore 306 having a shape complimentary to a size and/or shape of the first section 325 to provide a stopping edge 330. The second end 314 of the adjuster 302 may further include a seal 332 disposed within a seal gland 334 of the second end 314 to prevent the fluid from flowing past the seal 332 and to ensure the fluid flows substantially through the secondary orifice(s) 322 and the bleed orifice(s) 303. The second end 314 may further include a slot 336 operable via a tool (e.g., a screwdriver) to enable the adjuster 302 to rotate relative to the adjusting screw 304. The stem portion 310 is threadably coupled to the bore 306 via threads 337 such that rotating the adjuster 302 relative to the adjusting screw 304 enables the adjuster 302 to move relative to the adjusting screw 304 along the axis 228.

A retainer 338 may be disposed adjacent to the second end 314 of the adjuster 302 and coupled to the adjusting screw 304. An edge 340 of the retainer 338 partially overlaps the second end 314 to limit the movement of the adjuster 302 in a first direction along the axis 228 to define a first position of the adjuster 302. Additionally or alternatively, movement of the adjuster 302 in a second direction along the axis 228 may be limited by the stopping edge 330 to define a second position such that the lip 326 engages the stopping edge 330 in the second position.

In this example, as the adjuster 302 moves from the first position in the second direction along the axis 228 to the second position and/or as the adjuster 302 moves from the second position in the first direction along the axis 228 to the first position, a size of the gap or opening 320 tends to increase and/or decrease and, thus, the flow parameters of the fluid tend to change. As a result, the magnitude of the damping effect tends to change as the adjuster 302 moves relative to the adjusting screw 304. Additionally, the first end 312 of the adjuster 302 may be tapered to facilitate fine adjustments of the size of the opening 320 via relatively small movements of the adjuster 302 along the axis 228. In some examples, the gap or opening 320 may be closed entirely such that the second end 314 is received by the bleed orifice 303 in the second position to prevent the fluid from flowing through the bleed orifice(s) 303.

Figures 3D, 3E:
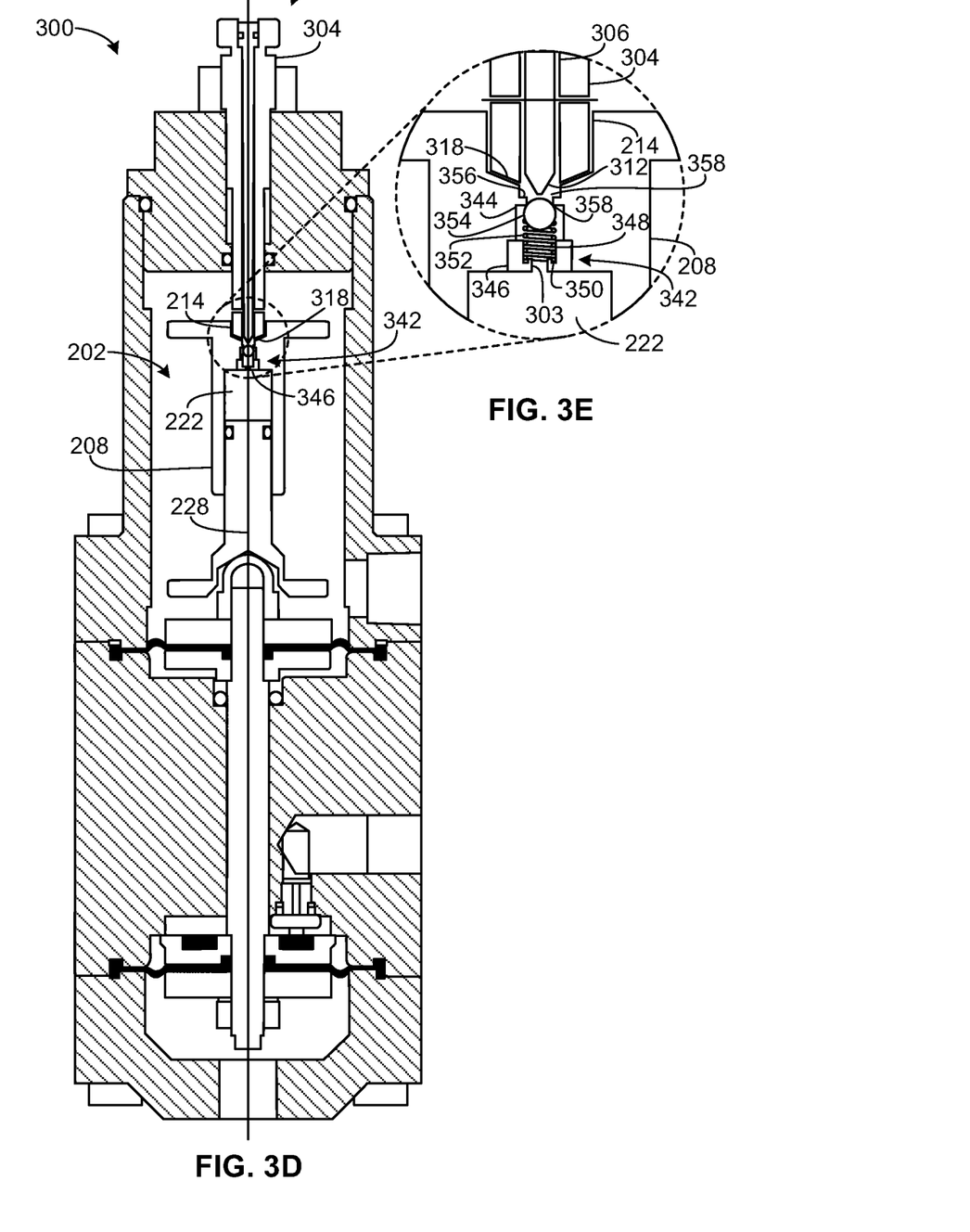
FIG. 3D illustrates an alternative example spring seat vibration damper apparatus in accordance with the teachings of this disclosure.
FIG. 3E is an enlarged cross-sectional view of the example spring seat vibration damper apparatus shown in FIG. 3D.

In another example, the bleed orifice(s) 303, the adjuster 302, and/or the example apparatus 202 may include a shut-off device or valve (e.g., a poppet valve) operable to open and/or close the bleed orifice 303. FIG. 3D illustrates the example pressure regulator 300 implemented with the example apparatus 202 including the adjuster 302 and a valve 342. FIG. 3E illustrates an enlarged cross-sectional view of the valve 342 shown in FIG. 3D. Turning in detail to FIGS. 3D and 3E, the valve 342 is operatively coupled to the upper portion 208 and disposed between the damping chamber 222 and the first end 312 of the adjuster 302. In this example, the surface 318 of the first annular recess 214 includes a secondary bore 344 (FIG. 3E) that is substantially complimentary (i.e., the same size and/or shape) to the bore 306 of the adjusting screw 304 that extends from the surface 318 of the first annular recess 214 to the damping chamber 222.

In this example, a cap 346 is disposed on an end of the secondary bore 344 and coupled to the upper portion 208 via any appropriate fastening technique or device. The bleed orifice 303 is centrally disposed on the cap 346 and located substantially on the axis 228. The cap 346 further includes a centrally disposed recess 348 having a shoulder 350 to receive and/or engage a biasing element 352 (e.g., a spring). The biasing element 352 may be sized to fit within the recess 348 and configured to urge a ball 354 disposed between the biasing element 352 and the first end 312 of the adjuster 302 to contact and/or engage the first end 312 of the adjuster 302 such that as the adjuster 302 moves along the axis 228 between an open and closed position, the ball 354 remains in a firm contact and/or engagement with the first end 312.

A lip or ring 356 coupled to the bore 306 and disposed between the ball 354 and the adjuster 302 may contact and/or engage the ball 354 in the closed position and may be configured to resist and support the biasing force from the biasing element 352. In such examples, the fluid may not flow through the valve 342 and/or the bleed orifice 234 when the adjuster 302 and/or the valve 342 are in the closed position.

As the adjuster 302 moves from the closed position along the axis 228 in the first direction to the open position, the ball 354 disengages the ring 356 to provide secondary gaps or openings 358 between the ring 356 and the ball 354 and between the ring 356 and the first end 312. In such examples, sizes of the secondary openings 358 in the open position are substantially larger than the size of the bleed orifice(s) 303 such that the damping effect is substantially provided by the bleed orifice(s) 303. Additionally or alternatively, sizes of the secondary openings 358 may be sensitive to relatively small movements or adjustments of the adjuster 302 to provide a substantially opened or closed bleed orifice 303 and/or valve 342.

From the foregoing, it will be appreciated that the above disclosed apparatus enable a controlled output pressure of the pressure regulator 300 and, more generally, an improved performance and stability of the pressure regulator 300 during operation. Due to the selection, arrangement, and configuration of the components of the example spring seat vibration damper apparatus 202, a magnitude of the damping effect is controlled and has a response that is substantially constant over a wide temperature range during operations of the pressure regulator 300. Further, the magnitude of the damping effect may be predetermined, selected and/or finely adjusted (e.g., via the adjuster 302) to minimize or eliminate rapid movements and/or the sensitivity of the diaphragms 122 and flow control member 116 to vibrations, oscillations, spurious pressure changes and/or other transient pressure changes within the control chamber 112. As a result, the output pressure of the pressure regulator 100 can remain substantially constant and unaffected by such vibrations and pressure changes or fluctuations. Further, support provided to the spring seats 204, 206 from the example apparatus 202 may effectively resist relative tilting between the spring seats 204, 206 and, thus, effectively resist and/or prevent buckling of the spring 132 within the pressure regulator 300.

Although the example apparatus 202 have been described in relation to the pressure regulator 300, the example apparatus 202 may be easily adapted, integrated and/or implemented to any suitable pressure regulator having a pair of spring seats and/or, more generally, having actuating components. Additionally, the example apparatus 202 may be easily accessible and/or operable via the adjusting screw 304. As a result, the example apparatus 202 may be advantageously used within any suitable pressure regulator without substantially redesigning and/or reconstructing or remanufacturing components of the pressure regulator 300 and, in some examples, may be accessed and/or adjusted in a similar manner that is required to adjust the control point of the pressure regulator.

Although certain example apparatus and articles of manufacture have been disclosed herein, the scope of coverage of this patent is not limited thereto. On the contrary, this patent covers all apparatus and articles of manufacture fairly falling within the scope of the claims of this patent. While the examples disclosed herein are related to pressure regulators, the examples disclosed herein may be applied to any appropriate fluid control devices.

What is claimed is:
1. An apparatus comprising:
a spring seat assembly positionable in a control chamber of a fluid pressure regulator to be fluidly isolated from a fluid flow path defined between an inlet and an outlet of the fluid pressure regulator, the spring seat assembly to provide a biasing force to a diaphragm of the fluid pressure regulator, the biasing force to define a desired output pressure of the fluid pressure regulator, the spring seat assembly to provide a damping effect to dissipate energy during operation of the fluid pressure regulator, the spring seat assembly including:
a first spring seat defining a first protrusion; and a second spring seat defining a second protrusion, the second protrusion configured to receive at least a portion of the first protrusion, the first spring seat to move relative to the second spring seat to provide the damping effect between the protrusions.

2. The apparatus of claim 1, wherein the second protrusion includes a cavity configured to slidably receive at least the portion of the first protrusion.

3. The apparatus of claim 2, further including a seal disposed between a wall of the cavity and the first protrusion to prevent a compressible fluid in the cavity from flowing past the seal.

4. The apparatus of claim 2, wherein the second protrusion includes a first orifice to enable a fluid to move through the first orifice as the first spring seat moves relative to the second spring seat.

5. The apparatus of claim 1, wherein a magnitude of the damping effect is adjustable.

6. The apparatus of claim 1, wherein the first protrusion and the second protrusion are cylindrically-shaped.

7. The apparatus of claim 6, wherein the cylindrically-shaped protrusions are sized to fit within a coil spring.

8. The apparatus of claim 7, wherein at least the portion of the first cylindrically-shaped protrusion engages the second cylindrically shaped protrusion to align respective longitudinal axes of the first spring seat, the second spring seat, and the coil spring.

9. The apparatus of claim 4, wherein the cavity includes a second orifice spaced from the first orifice to enable the first fluid to flow therethrough, the first orifice and the second orifice configured to balance forces imparted on the second protrusion by the first fluid.

10. The apparatus of claim 9, wherein the first orifice and the second orifice are positioned on the same axis.

11. The apparatus of claim 4, wherein the first orifice has a cross-sectional shape that is tapered.

12. The apparatus of claim 1, wherein the spring seat assembly is positioned between a diaphragm plate and an adjusting screw of the fluid pressure regulator.

13. The apparatus of claim 12, wherein a nut of a diaphragm plate interposed between the second spring seat and the diaphragm plate is to engage the second spring seat.

14. The apparatus of claim 12, wherein the adjusting screw is to engage the first spring seat and is to adjust the biasing force provided by a spring positioned between the spring seats.

15. An apparatus, comprising:
a first spring seat; and
a second spring seat opposite the first spring seat, the first spring seat and the second spring seat to capture a biasing element positionable in a control chamber of a fluid pressure regulator to be fluidly isolated from a fluid flow path defined between an inlet and an outlet of the fluid regulator, at least a portion of the first spring seat slidably disposed in the second spring seat to form a damping chamber between the spring seats to provide a damping effect in response to the first spring seat moving relative to the second spring seat, the biasing element to provide a biasing force to define a desired output pressure of the pressure regulator, the first spring seat including a first recess to receive an adjustor to vary the desired output pressure of the fluid pressure regulator and the second spring seat including a recess to receive a fastener of a diaphragm plate coupled to a diaphragm of the fluid pressure regulator.

16. The apparatus of claim 15, wherein the damping chamber includes a bleed port to enable a compressible fluid to move between an interior of the chamber and an exterior of the chamber to provide a damping effect.

17. The apparatus of claim 16, wherein a magnitude of the damping effect is adjustable.

18. The apparatus of claim 15, wherein at least the portion of the first spring seat engages a wall of the chamber to provide a seal between the portion of the first spring seat and the chamber to prevent a compressible fluid from flowing past the seal.

19. The apparatus of claim 18, wherein the seal includes an O-ring.

20. The apparatus of claim 18, wherein at least the portion of the first spring seat engages the wall of the chamber to fix a longitudinal axis of the first spring seat relative to a longitudinal axis of the second spring seat.

21. The apparatus of claim 15, further including a seal positioned between the first spring seat and the second spring seat to prevent a compressible fluid in the damping chamber from flowing past the seal.

22. An apparatus comprising:
a spring seat assembly positionable in a control chamber of a pressure regulator to be fluidly isolated from a process fluid flow path defined between an inlet and an outlet of the pressure regulator, the spring seat assembly to provide a biasing force to a diaphragm of the pressure regulator to define a desired output pressure of the pressure regulator, the spring seat assembly including:
a first spring seat;
a second spring seat slidably coupled to the second spring seat, the first and second spring seats defining a damping chamber to dampen relative movement between the first and second spring seats, the first spring seat including a first recess to receive an adjusting screw and the second spring seat including a second recess to receive a diaphragm plate nut of a diaphragm plate; and
a spring positioned between the spring seats, the first spring seat and the second spring seat to provide a damping effect to dissipate energy during operation of the pressure regulator to at least one of reduce vibration or turbulence induced output pressure fluctuations, oscillations or instabilities.

23. The apparatus of claim 22, wherein the damping chamber includes a bleed orifice to enable fluid in the damping chamber to flow through the bleed orifice.

24. The apparatus of claim 23, wherein a parameter of the flow is adjustable.

25. A pressure regulator comprising:
a bonnet defining a control chamber of the pressure regulator;
a valve body coupled to the bonnet, the valve body defining a fluid flow passageway between an inlet and an outlet;
a diaphragm positionable between the bonnet and the valve body to fluidly isolate the control chamber and the fluid flow passageway; and
a spring seat assembly positionable in the control chamber to provide a biasing force to the diaphragm, the biasing force to define a desired output pressure of the fluid pressure regulator, the spring seat assembly to provide a damping effect to dissipate energy during operation of the fluid pressure regulator, the spring seat assembly including:
a first spring seat defining a first protrusion; and
a second spring seat defining a second protrusion, the second protrusion configured to receive at least a portion of the first protrusion, the first spring seat to move relative to the second spring seat to provide the damping effect.

\* \* \* \* \*